May 26, 1925.
O. A. SMITH
TOOL HOLDING MEANS
Filed Oct. 26, 1921
1,539,439
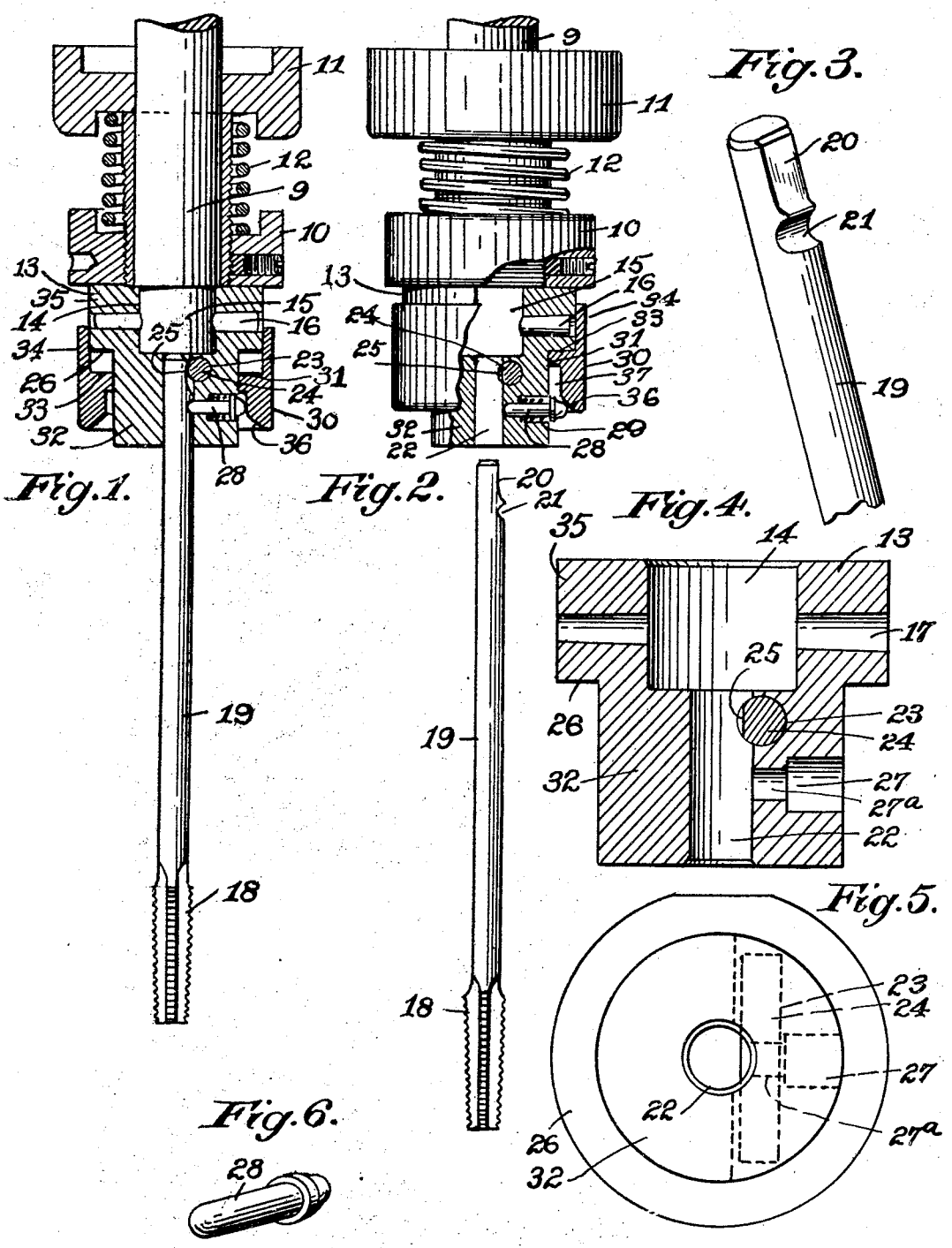
Inventor
Oscar A. Smith
By his Attorneys
Weed & Gray Patented May 26, 1925.

1,539,439

UNITED STATES PATENT OFFICE.

OSCAR AUGUST SMITH, OF EAST CLEVELAND, OHIO, ASSIGNOR TO THE NATIONAL ACME COMPANY, OF CLEVELAND, OHIO, A CORPORATION OF OHIO.

TOOL-HOLDING MEANS.

Application filed October 26, 1921. Serial No. 510,413.

*To all whom it may concern:*

Be it known that I, OSCAR A. SMITH, a citizen of the United States, residing at East Cleveland, in the county of Cuyahoga and State of Ohio, have invented certain new and useful Improvements in Tool-Holding Means, of which the following is a specification.

This invention relates to improvements in tool holding means, particularly adapted to be used for drills, taps or other tools, an object thereof being to provide simple and efficient tool holding mechanism wherein the tool may be removed therefrom without necessitating the stopping of the spindle, and at the same time to provide a mechanism so constructed as to permit the same to operate upon a very small diameter of tool. As a result of the present improvement therefore, a tool such as a drill or threading tool may be readily removed and inserted while the spindle is rotating and also will effectively cooperate with a tool having a relatively small shank.

Other objects of this invention will appear in the following description thereof, reference being had to the accompanying drawings forming a part of this specification wherein like reference characters indicate corresponding parts in the several views and wherein Fig. 1 is a sectional side view illustrating my improvement and also showing the end of the spindle and other related parts; Fig. 2 is a view similar to Fig. 1 partly broken away and partly in section illustrating another position of certain of the parts; Fig. 3 is a fragmentary perspective view of the tool; Fig. 4 is a vertical cross section of the tool holder; Fig. 5 is a bottom plan view of the construction shown in Fig. 4; and Fig. 6 is a detail perspective view of the plunger or locking pin.

As hereinbefore stated the essential purpose of this invention is to provide a tool holder constructed in such improved manner as to permit the tool to be attached and detached therefrom during the operation of the machine and at the same time to provide a tool holder in which locking mechanism for holding the tool in operative position will effectively coact with a tool having a shank of very small diameter. In carrying out this purpose therefore it will be seen that the tool holder is located adjacent to the end of a rotary spindle 9, the latter having a collar 10 secured thereto and another collar 11 loosely mounted thereon, each thereof suitably bored to house between the same a spring 12. For a description of the function of these parts in a metal working machine, reference is made to the co-pending joint application of applicant and G. J. Leber, for nut tapping machines, Serial No. 529,948, filed January 17, 1922. My improved tool holder 13 is bored to a suitable diameter at 14 to receive the end 15 of the spindle, the same being secured thereto as by means of a pin 16 inserted in a hole 17 projecting through the upper portion of the holder and registering with a corresponding hole in the spindle.

In the present instance by way of example this improved tool holding mechanism is shown as applied to a tap 18, although of course it is understood that any other tool may be substituted therefor. The tap 18 it will be seen is provided with a shank 19 having at its upper end a flattened or slabbed-off portion 20. Preferably below this flattened portion the tap shank is provided with a transverse recessed portion 21. The main holder 13 is drilled at 22 to provide a central bore of small diameter corresponding to that of the shank 19. Adjacent to the upper end of the bore 22 the holder is recessed as at 23 for the reception of a driving pin 24 suitably secured therein. This driving pin 24 is slabbed off or flattened as at 25 and projects part way into the bore 22, it being noted that the same is located at right angles thereto.

It will be noted that the holder is so constructed as to have a shoulder formed portion 26. At right angles to the bore 22 and communicating therewith is a two-section bore 27 adapted to receive a spring controlled plunger 28. A spring 29 is housed in the bore 27 between the head of the plunger and a shoulder of the bore whereby the spring normally tends to force the plunger to the position shown in Fig. 2. It will be understood that the plunger is of suitable diameter to freely extend through the smaller bore 27ᵃ of the bore 27 and upon forcing the plunger inwardly the same will project into the bore 22 of the holder and cooperate with the groove 21 in the tool. It will be understood also that upon locating the tap or tool 18 in its proper position as shown in Fig. 1, the slabbed-off or flattened portion 20 will cooperate with the inwardly projecting part of the driving pin 24.

Slidably mounted upon the outside of the holder is a sleeve 30, the same being of suitable size as indicated at 31 to cooperate with the smaller end portion 32 of the holder and is bored out adjacent to its upper end to provide a flange 33 adapted to abut or impinge against the shoulder 26, and a portion 34 to slidably embrace the upper portion 35 of the holder. The operating sleeve 30 adjacent to its lower end is provided with a curved cam surface 36 and the sleeve is suitably recessed as at 37 to receive the projecting portion of the plunger.

In operation it will be readily observed that it is merely necessary in order to secure the tool 18 in operative position in the bore 22 to force down the sleeve 30 so that the tapered or cam surface 36 will engage the head of the plunger and force the same inwardly, the plunger as shown in Fig. 1 being securely held in its position within the recess 37 against the inner wall of the sleeve. Thus the transverse hardened driving pin 24 which engages the slabbed-off portion 20 of the tool prevents the tool from turning or rotating independently of the holder, the tool therefore at all times rotating with the holder while the driving pin holds the tool in fixed position against rotation free of the holder. The spring actuated wedge controlled plunger 28 projecting into the transverse groove 21 in the tool holds the tap firmly against longitudinal or lengthwise displacement, or in other words holds the tap against removal. When the sleeve is retracted or forced upwardly the tapered face 36 thereof leaves the outer end of the plunger and the spring 29 shifts the plunger outwardly and away from the groove 21 thereby permitting the tap to be removed. Thus it is obvious that by merely manipulating the sleeve 30, which may be done by hand, the tool may be removed from and replaced in the machine without disturbing the operation thereof and at the same time the tool may be rigidly and effectively held in operative position when desired.

From the foregoing it will be observed that I have provided a quick releasable means whereby during the movement of the spindle, as for instance, its rotation, even at high speed, the tool may be readily withdrawn or inserted into its holder for it will be observed that the notch or groove or reduced portion 21 is at one side, as at the inside or below, the slabbed-off portion 20 thereof, and that as the slabbed-off portion 20 in cooperation with the hardened pin 24 merely holds the parts together to prevent independent rotation of one relatively to the other, it follows that when the pin is released from the notch or groove 21 of the tool by the action of its spring on manually slipping the sleeve 30 rearwardly or upwardly, that the tool can be readily and quickly withdrawn from its holder. Thus the two holding means 24 and 28 cooperate to hold the tool in the holder against independent rotary and longitudinal movements, while the operating of one of the holding means as 28 permits the other as 24 to release the tool when the same is grasped by the hand and pulled out whether the spindle be a horizontally or a vertically rotatable one.

It will be noted that the spindle and its tool holder are mounted in vertical position and the operating sleeve 30 is freely mounted on the end of the tool holder so as to be manipulated by hand during the revolution of the spindle. When the sleeve is shifted upwardly against the stop shoulder 26, the flaring cam portion 36 of the sleeve permits the spring of the plunger 28 to force the plunger out of the bore 22. This flaring cam surface 36 rests at this time upon the rounded end of the plunger, and due to the tension of the spring 29 the plunger will support the sleeve 30 in the position shown in Fig. 2, and prevent the weight of the sleeve from inadvertently forcing the plunger into the bore 22, so that as a result the tool will be inserted into the bore without any danger of contact with the plunger. Thus, when the plunger is released as shown in Fig. 2, the spring 29 will positively hold the plunger out of the bore 22 and permit the plunger to support the sleeve 30 against any accidental downward movement of the sleeve during the rotation of the spindle, thus preventing the same from accidentally forcing the plunger into bore 22 so as to interfere with the insertion of the tool therein.

Although I have described my invention in its preferred form, it is to be understood that I do not limit myself to the construction herein shown and described except in so far as defined in the claim and embraced within the scope thereof.

I claim as my invention:

The combination of a rotary spindle having a bored tool holder of different diameters forming a shoulder, a tool releasably held in said bore and having a slabbed portion and therebelow a recess, a driving pin carried by said holder transversely of its bore for engaging the slabbed portion of said tool, a spring pressed plunger also carried by said holder and projecting into the tool recess, a shiftable sleeve carried by said holder of different diameters fitting the different diametered holder and spaced from a part of said holder and having a flaring end for engaging said plunger and a pair of shoulders one adapted to contact with the holder shoulder to limit the upward movement of the sleeve and the other to contact with the plunger to limit the downward movement of the sleeve, said plunger in its outward position contacting with the flaring end of the sleeve to hold it adjacent to the tool holder.

Signed at Cleveland, Ohio this 21st day of October 1921.

OSCAR AUGUST SMITH.